(12) United States Patent
Nishida et al.

(10) Patent No.: US 8,349,419 B2
(45) Date of Patent: Jan. 8, 2013

(54) RESIN-COATED SEAMLESS ALUMINUM CAN AND RESIN-COATED ALUMINUM ALLOY LID

(75) Inventors: Kazuhiro Nishida, Chitose (JP); Yasufumi Tadaki, Yokohama (JP); Satoshi Fujita, Yokohama (JP); Naoyuki Takagi, Yokohama (JP); Seitarou Kanazawa, Yokohama (JP); Toshio Sue, Yokohama (JP)

(73) Assignee: Toyo Seikan Kaisha, Ltd., Chiyoda-Ku, Tokyo (JP)

( * ) Notice: Subject to any disclaimer, the term of this patent is extended or adjusted under 35 U.S.C. 154(b) by 883 days.

(21) Appl. No.: 12/066,123

(22) PCT Filed: Sep. 6, 2006

(86) PCT No.: PCT/JP2006/317681
§ 371 (c)(1),
(2), (4) Date: Apr. 9, 2009

(87) PCT Pub. No.: WO2007/029755
PCT Pub. Date: Mar. 15, 2007

(65) Prior Publication Data
US 2009/0220714 A1 Sep. 3, 2009

(30) Foreign Application Priority Data

Sep. 9, 2005 (JP) .................. 2005-263098
Sep. 9, 2005 (JP) .................. 2005-263099

(51) Int. Cl.
*C23C 22/07* (2006.01)
*C09D 5/08* (2006.01)
*C09D 161/06* (2006.01)
*C22C 21/00* (2006.01)
*C22C 21/06* (2006.01)

(52) U.S. Cl. .................. 428/35.9; 428/36.8; 428/411.1; 428/458; 428/461

(58) Field of Classification Search .................. 428/35, 428/35.9, 36.8, 411.1, 458, 461
See application file for complete search history.

(56) References Cited

FOREIGN PATENT DOCUMENTS

| JP | 09136062 A | * | 5/1997 |
|----|------------|---|--------|
| JP | 11035880 A |   | 2/1999 |
| JP | 11229156 A | * | 8/1999 |
| JP | 2000006979 A |   | 1/2000 |
| JP | 2000325872 A |   | 11/2000 |
| JP | 2001121648 A | * | 5/2001 |
| JP | 2002338881 A |   | 11/2002 |

* cited by examiner

*Primary Examiner* — Kelechi Egwim
(74) *Attorney, Agent, or Firm* — Browdy and Neimark, PLLC (57) ABSTRACT

The present invention provides a resin coated seamless aluminum can and a resin coated aluminum can lid having adhesiveness and corrosion resistance by applying a non-chromium chemical conversion coated film to an aluminum alloy sheet and by applying an organic resin layer to the non-chromium chemical conversion coated film. For this end, an organic-inorganic composite surface treated layer containing 2 to 20 mg/m² of zirconium compound expressed in terms of zirconium atoms, 1 to 10 mg/m² of phosphorus compound expressed in terms of phosphorus atoms, and 5 to 60 mg/m² of organic compound expressed in terms of carbon atoms is formed on at least one-side surface of an aluminum alloy sheet, and an organic resin coated layer is formed on the organic-inorganic composite surface treated layer.

10 Claims, 2 Drawing Sheets

RESIN-COATED SEAMLESS ALUMINUM CAN AND RESIN-COATED ALUMINUM ALLOY LID

TECHNICAL FIELD

The present invention relates to a resin coated seamless aluminum can and a resin coated aluminum alloy can lid having corrosion resistance and adhesiveness which are manufactured by forming an organic-inorganic composite resin coated layer on at least one-side surface of an aluminum alloy sheet and by further forming a resin coated layer on the organic-inorganic composite resin coated layer.

BACKGROUND ART

In manufacturing can bodies and can lids used as beverage cans or the like, an aluminum sheet or an aluminum alloy sheet is used. Although aluminum exhibits excellent formability and excellent flavor keeping property as a can body material and can lid material, aluminum has a drawback that aluminum exhibits less corrosion resistance compared to a surface-treated steel material.

On the other hand, a chromium-phosphate-based surface treatment agent has been used for applying surface treatment to the aluminum sheet. A chemical conversion coating formed on the aluminum sheet by the chromium-phosphate-based surface treatment agent exhibits the excellent corrosion resistance peculiar to the film and also exhibits excellent corrosion resistance and adhesiveness after coating various resin-based coating materials. Accordingly, the aluminum sheet coated with the chemical conversion coating has been used in broad application fields of aluminum material such as an architectural material, a household electrical appliance, a fin material, a car evaporator or a beverage can material.

However, recently, from a viewpoint of protection of environment, there has been a demand for a non-chromium-based surface treatment agent which can impart high corrosion resistance and adhesiveness compatible to the corrosion resistance and adhesiveness of the chromium-phosphate-based surface treatment agent.

As the non-chromium surface treatment agent used for forming the beverage can body, for example, the non-chromium surface treatment agent of a system which uses zirconium or titanium compound and phosphate compound. However, the chemical conversion coating formed of these systems exhibits less corrosion resistance and adhesiveness after coating compared to the film formed using the chromium-phosphate-based surface treatment agent and hence, the chemical conversion coating is not used in broad applications.

For example, JP-A-10-46101 (patent document 1) discloses aluminum-use surface treatment agent containing a phosphate-based compound and/or an organosilicon compound and organic compound polymer. However, the surface treatment agent used in such a technique leads to insufficient adhesiveness between a metallic material and a coating material and insufficient corrosion resistance of a coating material.

Further, JP-A-2000-6967 (patent document 2) and JP-A-2000-6979 (patent document 3) disclose a polyester resin coated aluminum seamless can having a composite formed coated film made of phosphoric acid or zirconium phosphate and an organic resin. However, in such a technique, when an aluminum alloy sheet material on which a thermoplastic resin layer is formed is formed by molding by applying strict forming such as deep drawing or drawing and ironing after the formation of the composite formed coated film, the formed can cannot acquire satisfying corrosion resistance and satisfying adhesiveness with a thermoplastic resin layer.

JP-B-56-33468 (patent document 4) discloses an aluminum-use surface treatment agent containing zirconium and/or titanium, phosphate and a fluoric material. However, the surface treatment agent used in such a technique leads to insufficient adhesiveness between a metallic material and a coating material and insufficient corrosion resistance of a coating material.

JP-B-63-30218 (patent document 5) discloses a non-chromium-based surface treatment agent containing water-soluble titanium and/or a zirconium compound, tannin and/or water-soluble or water-dispersing polymer. However, such a non-chromium-based surface treatment agent leads to insufficient corrosion resistance of a coating material.

JP-A-2002-275648 (patent document 6) discloses a metal surface treatment agent containing a water-soluble zirconium compound, a water-soluble or water-dispersing acrylic resin, and a water-soluble or water-dispersing thermosetting cross-linking material.

JP-A-2003-239079 (patent document 7) discloses a metal-surface chemical conversion treatment agent containing zirconium ion and an organic phosphoric acid compound, and pH of the water solution is set to equal to or larger than 1.8 and equal to or smaller than 4.0. However, a formed can formed by using either one of these surface treatment agents cannot acquire sufficient corrosion resistance and sufficient adhesiveness.

[Patent document 1] JP-A-H10-46101
[Patent document 2] JP-A-2000-6967
[Patent document 3] JP-A-2000-6979
[Patent document 4] JP-B-S56-33468
[Patent document 5] JP-B-S63-30218
[Patent document 6] JP-A-2002-275648
[Patent document 7] JP-A-2003-239079

DISCLOSURE OF THE INVENTION

The present invention has been made to overcome these drawbacks which these prior arts possess. To be more specific, it is an object of the present invention to provide a resin coated seamless aluminum can which is used as a food can or a beverage can, exhibits favorable corrosion resistance even when the can is formed by molding by applying strict forming such as deep drawing, drawing and ironing or stretch drawing after laminating the can with a thermoplastic resin without using chromium on a surface treated layer, and exhibits excellent adhesiveness with a thermoplastic resin at the time of forming the can.

Further, it is another object of the present invention to provide an aluminum-alloy-made can lid which exhibits favorable corrosion resistance even when the can lid is formed by molding by applying strict forming after forming a coated film using a water-based coating material or laminating the can lid with a thermoplastic polyester resin, and exhibits excellent adhesiveness with the coating material or a thermoplastic lamination film at the time of forming the can lid.

Means for Overcoming Drawbacks

A resin coated seamless aluminum can described in claim 1 is characterized in that an organic-inorganic composite surface treated layer made of a zirconium compound, a phosphorus compound and an organic compound is formed on at least one-side surface of an aluminum alloy sheet, wherein an adhesion quantity of the zirconium compound is 2 to 20 mg/m$^2$ expressed in terms of zirconium atoms, an adhesion quantity of the phosphorus compound is 1 to 10 mg/m² expressed in terms of phosphorus atoms and an adhesion quantity of the organic compound is 5 to 60 mg/m² expressed in terms of carbon atoms, the organic compound is formed of an organic polymer having structure units expressed by the following formula (I), and an average molecular weight of the organic compound is 1,000 to 100,000 when all X are hydrogen atoms, and a thermoplastic resin layer is further formed on the organic-inorganic composite surface treated layer.

... (I)

In the formula (I), X in respective structural units are independently constituted of a hydrogen atom or a Z group expressed by the following formula (II) and an introducing ratio of the Z group per one benzene ring is 0.3 to 1.0.

... (II)

In the formula (II), R1 and R2 independently indicate a hydrogen atom, a C1 to C10 alkyl group or a C1 to C10 hydroxyalkyl group.

A resin coated seamless aluminum can described in claim 2 is, in the resin coated seamless aluminum can of claim 1, characterized in that the aluminum alloy sheet is an aluminum alloy sheet containing 0.2 to 5.5% by weight of Mg, 0.05 to 1% by weight of Si, 0.05 to 1% by weight of Fe, 0.01 to 0.35% by weight of Cu, 0.01 to 2% by weight of Mn, and 0.01 to 0.4% by weight of Cr.

A resin coated seamless aluminum can described in claim 3 is, in the resin coated seamless aluminum can of claim 1 or 2, characterized in that the thermoplastic resin is a polyester-based resin.

A resin coated seamless aluminum can described in claim 4 is, in the resin coated seamless aluminum can of any one of claims 1 to 3, characterized in that the aluminum can is formed by applying deep drawing or drawing and ironing to a resin coated aluminum alloy sheet, applying neck-in forming to the resin coated aluminum alloy sheet after heat setting, narrowing a mouth of a neck-in formed body to a predetermined diameter, and applying flange forming to the neck-in formed body.

A resin coated aluminum alloy can lid formed of an aluminum alloy sheet described in claim 5 is characterized in that an organic-inorganic composite surface treated layer including a zirconium compound, a phosphorus compound and an organic compound is formed on at least one-side surface of an aluminum alloy sheet, wherein a quantity of the zirconium compound is 2 to 20 mg/m² expressed in terms of zirconium atoms, a quantity of the phosphorus compound is 1 to 10 mg/m² expressed in terms of phosphorus atoms and a quantity of the organic compound is 5 to 60 mg/m² expressed in terms of carbon atoms, the organic compound is formed of an organic polymer having structure units expressed by the following formula (I), and an average molecular weight of the organic polymer is 1,000 to 100,000 when all X are hydrogen atoms, and an organic resin coated layer is further formed on the organic-inorganic composite surface treated layer.

... (I)

In the formula (I), X in respective structural units are independently constituted of a hydrogen atom or a Z group expressed by the following formula (II) and an introducing ratio of the Z group per one benzene ring is 0.3 to 1.0.

... (II)

In the formula (II), R1 and R2 independently indicate a hydrogen atom, a C1 to C10 alkyl group or a C1 to C10 hydroxyalkyl group.

A resin coated aluminum alloy can lid described in claim is, in the resin coated aluminum alloy can lid of claim 5, characterized in that the aluminum alloy sheet is an aluminum alloy sheet containing 0.2 to 5.5% by weight of Mg, 0.05 to 1% by weight of Si, 0.05 to 1% by weight of Fe, 0.01 to 0.35% by weight of Cu, 0.01 to 2% by weight of Mn, and 0.01 to 0.4% by weight of Cr.

A resin coated aluminum alloy can lid described in claim is, in the resin coated aluminum alloy can lid of claim 5 or 6, characterized in that the organic resin coated layer formed on the surface treated layer is a coated film.

A resin coated aluminum alloy can lid described in claim 8 is, in the resin coated aluminum alloy can lid of claim 5 or 6, characterized in that the organic resin coated layer formed on the surface treated layer is a thermoplastic resin.

BRIEF DESCRIPTION OF THE DRAWINGS

Numerals shown in FIGS. 1, 2 indicate following parts. 4: easy-to-open can lid, 5: center panel part, 6: reinforcing annular groove, 7: score, 8: trimming part to be opened, 9: tab tip for unsealing, 10: rivet

BEST MODE FOR CARRYING OUT THE INVENTION

Figure 1:
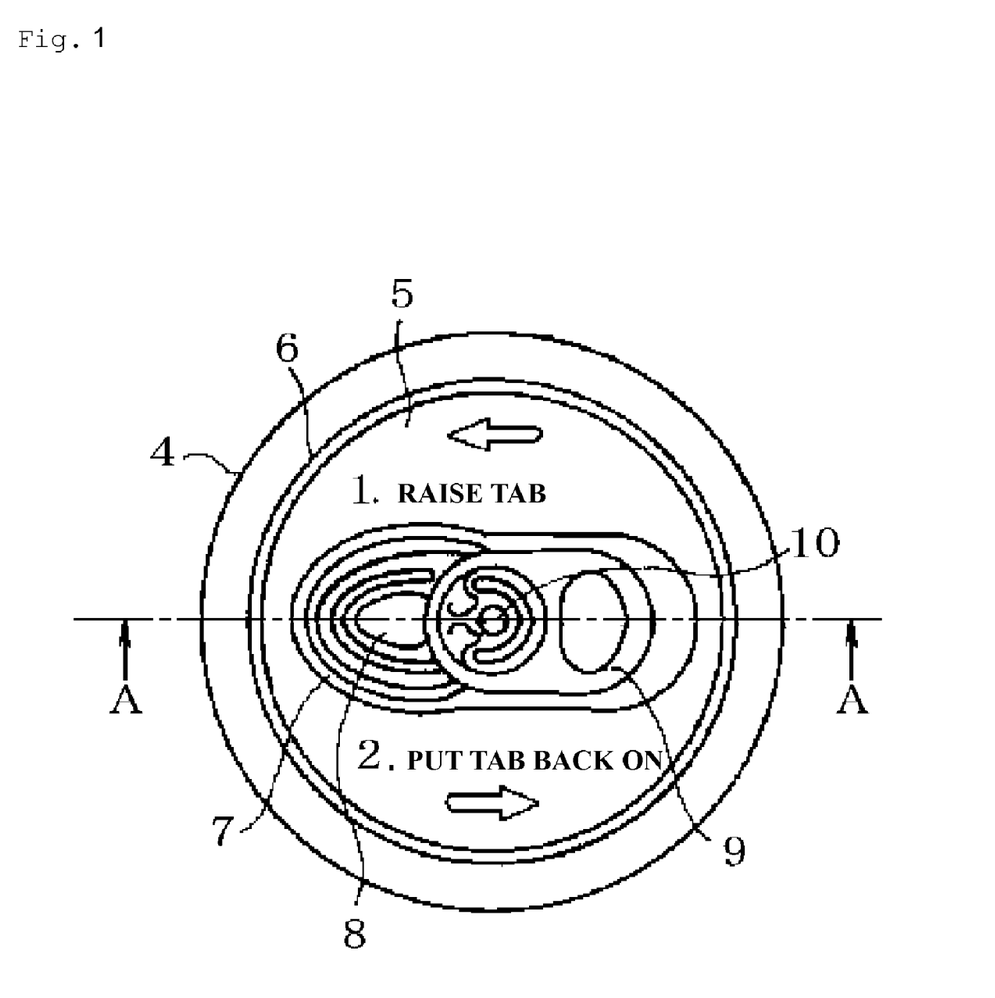
FIG. 1 is a top plan view of one example of a resin coated aluminum alloy can lid according to an embodiment of the present invention.
Figure 2:
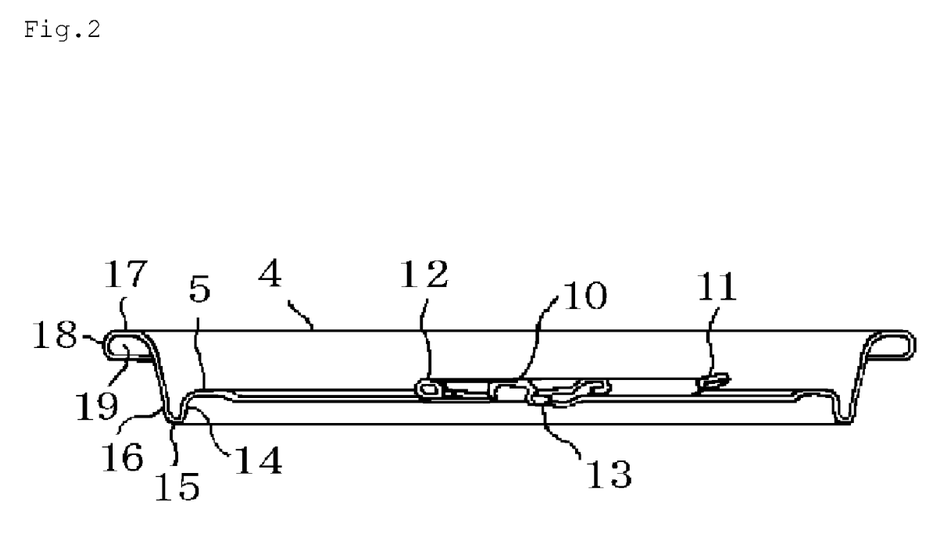
FIG. 2 is an enlarged cross-sectional view taken along a line A-A of the resin coated aluminum alloy can lid shown in FIG. 1.

A resin coated seamless aluminum can and a resin coated aluminum alloy can lid of the present invention is characterized in that an organic-inorganic composite surface treated layer made of a zirconium compound, a phosphorus compound and an organic compound is formed on at least one-side surface of an aluminum alloy sheet, wherein an adhesion quantity of the zirconium compound is 2 to 20 mg/m² expressed in terms of zirconium atoms, an adhesion quantity of the phosphorus compound is 1 to 10 mg/m² expressed in terms of phosphorus atoms and an adhesion quantity of the organic compound is 5 to 60 mg/m² expressed in terms of carbon atoms, the organic compound is formed of an organic polymer having structure units expressed by the following formula (I), and an average molecular weight of the organic compound is 1,000 to 100,000 when all X are hydrogen atoms, and a thermoplastic resin layer (or an organic resin coated layer in case of the can lid) is further formed on the organic-inorganic composite surface treated layer.

... (I)

In the formula (I), X in respective structural units are independently constituted of a hydrogen atom or a Z group expressed by the following formula (II) and an introducing ratio of the Z group per one benzene ring is 0.3 to 1.0.

... (II)

In the formula (II), R1 and R2 independently indicate a hydrogen atom, a C1 to C10 alkyl group or a C1 to C10 hydroxyalkyl group. The content of the present invention is explained in detail hereinafter.

(Constitution of Aluminum Alloy Sheet)

The aluminum alloy sheet is an aluminum alloy sheet containing 0.2 to 5.5% by weight of Mg, 0.05 to 1% by weight of Si, 0.05 to 1% by weight of Fe, 0.01 to 0.35% by weight of Cu, 0.01 to 2% by weight of Mn, and 0.01 to 0.4% by weight of Cr.

The above-mentioned alloy composition is set due to following reasons.

Mg is added to enhance strength of the aluminum alloy sheet. The reason that the content of Mg is limited to 0.2 to 5.5% by weight is that the desired strength cannot be obtained when the content of Mg is less than 0.2% by weight, and edge cracks are increased at the time of rolling when the content of Mg exceeds 5.5% by weight.

Si and Fe are added to improve the formability. The reason that the content of Si is limited to 0.05 to 1% by weight and the content of Fe is limited to 0.05 to 1% by weight is as follows. That is, both components are unavoidably included as components of the aluminum alloy sheet. It is difficult in usual treatment to restrict the content of Si and the content of Fe to less than 0.05% by weight. Further, when the content of Si or Fe exceeds 1% by weight, macro crystals is liable to be easily generated and hence, the formability is deteriorated.

Cu is added to improve the strength. The reason that the content of Cu is limited to 0.01 to 0.35% by weight is that the strength becomes poor when Cu is not added and cracks occur at the time of casting when the content of Cu exceeds an upper limit.

Mn and Cr are added to improve strength and heat resistance. Mn and Cr are added also to enhance a limit drawing ratio and to form crystal particles into microstructure. The reason that the content of Mn is set to 0.01 to 2% by weight and the content of Cr is set to 0.01 to 0.4% by weight is that when the contents of Mn and Cr are less than lower limits, the above-mentioned advantageous effects are small, while when the contents of Mn and Cr exceeds upper limits, the limit drawing ratio is decreased thus giving rise to the occurrence of cracks in a can manufacturing step and a can lid manufacturing step.

In the present invention, it is possible to use the aluminum alloy sheet having a thickness of 0.15 to 0.40 mm in general, and a thickness of 0.20 to 0.30 mm preferably.

When the thickness of the aluminum alloy sheet is less than 0.15 mm, the can or the can lid cannot be easily formed and, at the same time, cannot acquire desired strength. On the other hand, when the thickness of the aluminum alloy sheet exceeds 0.40 mm, the manufacture of the can or the can lid is deteriorated economically.

As the above-mentioned aluminum alloy sheet, specifically, an aluminum sheet, an aluminum-copper alloy sheet, an aluminum-manganese alloy sheet, an aluminum-silicon alloy sheet, an aluminum-magnesium alloy sheet, an aluminum-magnesium-silicon alloy sheet, an aluminum-zinc alloy sheet, an aluminum-zinc-magnesium alloy sheet and the like can be named.

As the above-mentioned aluminum alloy sheets, for example, an aluminum alloy material 5182, an aluminum alloy material 5021, an aluminum alloy material 5022, an aluminum alloy material 5052, an aluminum alloy material 3004, an aluminum alloy material 3005, an aluminum alloy material 3104, an aluminum alloy material 1100 or the like are preferably used.

Although a shape of the aluminum material sheet is not particularly limited, the shape of the aluminum material sheet is preferably formed into a shape which facilitates the lamination of a film. For example, the aluminum material sheet may be formed into a plate shape, a sheet shape or a coil shape.

(Organic-Inorganic Composite Surface Treatment Layer)

The organic-inorganic composite surface treated layer mainly aims at the acquisition of two advantageous effects, that is, imparting of corrosion resistance and imparting of adhesiveness with an aluminum material and a thermoplastic resin (coated film). It is preferable to use an organic polymer expressed by the following formula (I) in the formation of the organic-inorganic composite surface treated layer.

... (I)

In the formula (I), X in respective structural units are independently constituted of a hydrogen atom or a Z group expressed by the following formula (II) and an introducing ratio of the Z group per one benzene ring is 0.3 to 1.0.

... (II)

It is preferable that R1 and R2 shown in the formula (II) are independently constituted of a hydrogen atom, a C1 to C10 alkyl group or a C1 to C10 hydroxyalkyl group. The alkyl group or the hydroxyalkyl group of equal to or more than C11 has micro-porous portions and a dense film is not formed and hence, the corrosion resistance is deteriorated. Further, since the alkyl group portion is long, hydrophobicity is increased and hence, adhesiveness with the film is decreased.

The introducing ratio of the Z group indicated by X per one benzene ring is preferably 0.3 to 1.0. When the introducing ratio of the Z group is less than 0.3, the adhesiveness is insufficient. When the introducing ratio of the Z group exceeds 1.0, the water solution becomes excessive and the formation of surface film becomes difficult.

The introducing ratio of the Z group is calculated using a generally-used method and is not particularly limited. For example, the organic compound may be completely burnt by CHNS—O elemental analysis and the generated gases ($CO_2$, $H_2O$, $N_2$ and $SO_2$) may be measured to perform determination of respective elements so as to calculate the introducing ratio of the Z group.

The molecular weight of the organic polymer is preferably set to a value which falls within a range from 1,000 to 100,000 when all of the above-mentioned X are hydrogen atoms. When the molecular weight of the organic polymer is less than 1,000, the heating product exhibits insufficient flexibility and, cohesive failure occurs in the inside of the organic-inorganic composite coated film and the adhesiveness becomes insufficient at the time of forming. When the molecular weight of the organic polymer is more than 100,000, the organic polymer does not sufficiently act with the inorganic components which constitute the film and hence, the corrosion resistance becomes insufficient. The molecular weight of the organic polymer is more preferably set to a value which falls within a range from 1,000 to 10,000.

As the organic polymer, an organic polymer having one kind of average molecular weight may be used and, alternatively, a polymer having two or more kinds of average molecular weight may be used.

The molecular weight can be measured using gel permeation chromatography after the coated film is peeled off.

The adhesion quantity of the organic substance in the inside of the organic-inorganic composite coated film influences the corrosion resistance and the adhesion quantity of the organic-inorganic composite film. The adhesion quantity of the organic substance is preferably set to a value which falls within a range from 5 to 60 $mg/m^2$ expressed in terms of carbon atoms. When the adhesion quantity of carbon is less than 5 $mg/m^2$, carbon cannot sufficiently cover the surface of the aluminum alloy and hence, the organic-inorganic composite film cannot acquire sufficient adhesiveness and sufficient corrosion resistance. Although there arises no functional drawback even when the adhesion quantity of carbon exceeds 60 $mg/m^2$, there arises drawbacks such as an undesired change in appearance and the increase of cost.

The above-mentioned adhesion quantity of carbon can be measured using commercially-available surface carbon analytical equipment. The surface carbon analytical equipment adopts a principle that a temperature of a sample is raised, carbon which exists on the surface of the sample is oxidized and gasified, and the gas is determined using IR (infrared absorption). The measurement condition may be any condition provided that the carbon on the surface of the sample can be oxidized and gasified. However, generally, it is preferable that the measurement is performed under a condition at a temperature of 400 to 500° C. for 5 to 10 minutes.

The polymer expressed by the formula (I) can be manufactured by an ordinary method. For example, the polymer expressed by the formula (I) is manufactured by performing polycondensation on a phenolic compound or a naphthol compound with formaldehyde and, subsequently, by introducing a functional group X using formaldehyde and amine. Formalin is generally used as formaldehyde. Although the molecular weight of the polymer is not particularly limited, when all X are hydrogen atoms, it is suitable to set the molecular weight of the polymer to approximately 1,000 to 100,000 and, preferably to approximately 1,000 to 10,000.

The organic-inorganic composite surface treated layer (hereinafter referred to as "surface treated film" in some cases) includes a zirconium compound. An adhesion quantity of the zirconium compound influences corrosion resistance and adhesiveness. The adhesion quantity of the zirconium compound is preferably set to a value which falls within a range from 2 to 20 $mg/m^2$ expressed in terms of zirconium atoms. When the adhesion quantity of zirconium is less than 2 $mg/m^2$, in the same manner as the adhesion quantity of carbon, zirconium cannot sufficiently cover a surface of the aluminum alloy and hence, the organic-inorganic composite surface treated layer exhibits insufficient corrosion resistance. When the adhesion quantity of zirconium exceeds 20 $mg/m^2$, cohesive failure easily occurs in the inside of the surface treated film at the time of forming and hence, there arises a possibility that adhesiveness is deteriorated.

Although the zirconium compound used for the surface treated film is not specifically limited provided that the compound contains zirconium. A water-soluble zirconium compound containing fluorine may preferably be used because of the stability in pH thereof and the excellent film formability thereof.

Although the water-soluble zirconium compound containing fluorine is not limited specifically, for example, $H_2ZrF_6$, $(NH_4)_2ZrF_6$, $K_2ZrF_6$, $Na_2ZrF_6$, $Li_2ZrF_6$ or the like can be named. These compounds may be used in a single form or in combination of two or more kinds of the compounds.

The organic-inorganic composite surface treated layer (surface treated film) includes a phosphorus compound. The adhesion quantity of the phosphorus compound is preferably set to a value which falls within a range from 1 to 10 $mg/m^2$ expressed in terms of phosphorous atoms. When the adhesion quantity of phosphorus is less than 1 $mg/m^2$, due to the same reason as described above with respect to the adhesion quantity of zirconium, the organic-inorganic composite surface treated layer exhibits insufficient corrosion resistance. When the adhesion quantity of phosphor exceeds 10 mg/m$^2$, there arises a possibility that the adhesiveness is deteriorated.

The above-mentioned phosphorus compound in the surface treated film is preferably a phosphoric-acid-based chemical compound from a viewpoint of enhancing the adhesiveness between the organic resin layer and a metal material. As the phosphoric-acid-based chemical compound which can be used for the above-mentioned object, a phosphoric acid or a salt thereof, a condensed phosphoric acid or salt thereof, zirconium phosphate, titanium phosphate or the like can be named. Here, as the salt, an alkali metal salt such as an ammonium salt, a sodium salt, a potassium salt or the like can be named. Further, an organic silicon compound can be mixed for improving the adhesiveness. As the organic silicon compound, vinyl ethoxy silane, γ-aminopropyltriethoxysilane, N-(β-aminoethyl)-γ-aminopropyltriethoxysilane, γ-mercapto propyl trimethoxysilane, γ-glycidoxypropyltrimethoxysilane, γ-methacryloxypropyltrimethoxysilane or the like can be named.

The adhesion quantity of the zirconium compound and the adhesion quantity of the phosphorus compound can be determined using a commercially-available X-ray fluorescence analyzer. That is, a plurality of samples whose adhesion quantities of zirconium and phosphorus are known differ from each other in adhesiveness are measured, and a calibration curve of strength-adhesion quantity is obtained based on measured strengths. Under the similar conditions, a sample is cut out from a coated metal material of the present invention and the strength of the sample is measured. By converting the measured strength into the adhesion quantity based on the calibration curve, the adhesion quantity of the zirconium compound and the adhesion quantity of the phosphorus compound can be measured.

With respect to a thickness of the organic-inorganic composite surface treated layer, it is necessary to set the film thickness to a value which falls within a range from 5 to 500 nm. The film thickness is preferably set to a value which falls within a range from 15 to 300 nm, and is more preferably set to a value which falls within a range from 50 to 300 nm. When the film thickness is less than 5 nm, the organic-inorganic composite surface treated layer cannot acquire excellent adhesiveness with a coated film or a lamination film. When the film thickness exceeds 500 nm, there exists a high possibility that a color tone of the metal material is deteriorated.

Further, the organic-inorganic composite surface treated layer preferably covers 90% or more of a surface of the aluminum alloy material. When the coverage of the organic-inorganic composite surface treated layer is less than 90%, the film is easily peeled off at the time of processing.

The film thickness and the coverage of the organic-inorganic composite surface treated layer can be determined using commercially-available XPS (X-ray photoelectron spectroscopy analysis) equipment using an ordinary method. The XPS is a device which excites a sample using X rays in a ultra-high vacuum ($10^{-5}$ Pa or less) and analyzes photoelectrons emitted at the time of excitation. A ratio of atoms present on a surface of the organic-inorganic composite surface treated layer can be calculated using an intensity of the photoelectrons and a sensitivity coefficient.

(Treatment Liquid)

The organic-inorganic composite surface treated layer can be acquired by applying a film treatment using an organic-inorganic composite surface treatment liquid to an aluminum alloy sheet.

The treatment liquid is prepared by dissolving polymer, a zirconium compound and a phosphorus compound into water which constitutes a solvent. Hereinafter, the preparation of the adjustment of the treatment liquid is explained.

The treatment liquid contains water soluble polymer for forming a film made of an organic compound. Phosphate ion and complex fluoride of zirconium may preferably coexist with the water soluble polymer. Further, pH of the treatment liquid is preferably adjusted to a value which allows the water-soluble polymer, the phosphate and the complex fluoride to easily precipitate. The treatment is performed by bringing the treatment liquid into contact with the aluminum alloy sheet. During treatment, the aluminum surface is etched by the fluorine compound, and pH is increased on an interface between the treatment liquid and the aluminum surface. Accordingly, the water soluble polymer and phosphorus compound which coexist are deposited on the surface of the aluminum alloy sheet to form a film. The aluminum alloy sheet treated by the surface treatment is cleaned with water for removing unreacted products. Further, the aluminum sheet is cleaned with deionized water or the like and, thereafter, the aluminum sheet is dried thus acquitting the surface treated aluminum alloy sheet.

In the treatment liquid, it is necessary to set the polymer concentration more than 100 mg/L. The polymer concentration may preferably be set to a value which falls within a range from 100 to 10,000 mg/L, and more preferably, a value which falls within a range from 300 to 3,000 mg/L. When the polymer concentration is less than 100 mg/L, a film is not formed sufficiently. On the other hand, when the polymer concentration exceeds 10,000 mg/L, the manufacturing cost is pushed up.

In the treatment liquid, a content of the zirconium compound is, in terms of zirconium, set to a value which falls within a range from 100 to 10,000 mg/L, and more preferably, a value which falls within a range from 300 to 1,000 mg/L. When the content of the zirconium compound is less than 100 mg/L, a sufficient quantity of zirconium film cannot be acquired by the treatment for a short time, and there exists a possibility that the adhesiveness and the corrosion resistance are decreased. On the other hand, when the content of the zirconium compound exceeds 10,000 mg/L, the enhancement of properties and the shortening of treatment time cannot be recognized and, at the same time, a manufacturing cost is pushed up.

In the above-mentioned treatment liquid, a content of the phosphorous compound is, in terms of phosphorous, set to a value which falls within a range from 100 to 10,000 mg/L, and more preferably, a value which falls within a range from 300 to 1,000 mg/L. When the content of the phosphorous compound is less than 100 mg/L, a proper quantity of phosphorous film cannot be acquired in a formed film and there exists a possibility that the coated-film adhesiveness after coating is lowered. On the other hand, even when the content of the phosphorous compound exceeds 10,000 mg/L, the phosphorous compound is merely present excessively and no enhancement of the adhesiveness and the corrosion resistance are recognized and the manufacturing cost is pushed up.

pH of the above-mentioned treatment liquid is set to a value which falls within a range from a lower limit of 2.5 to an upper limit of 5.5. When pH of the treatment liquid is less than 2.5, etching of a surface of metal is excessively accelerated and hence, the film appearance is deteriorated and, at the same time, the corrosion resistance of the acquired film is also deteriorated. When pH of the treatment liquid exceeds 5.5, a chemical conversion reaction does not advance in a satisfying manner thus making the formation of the chemical conversion film difficult. The lower limit is preferably 2.8 and the upper limit is preferably 4.0.

As the organic-inorganic composite surface treatment liquid, an etching auxiliary agent, a chelating reagent, or a pH modifier can be used in addition to the above-mentioned components when necessary.

As the above-mentioned etching auxiliary agent, for example, a hydrogen peroxide, a hydrofluoric acid, a hydrofluoric acid salt, a fluoridation boric acid or the like can be named. Here, when a complex of the zirconium named as the water-soluble zirconium compound is used as a supply source of the fluorine ion, a quantity of generated fluoric ion is insufficient and hence, it is desirable to use the above-mentioned fluoric compound in common.

As the chelating reagent, for example, an acid which forms the complex with aluminum and metal salt thereof such as a citric acid, a tartaric acid or a gluconic acid can be named.

As the above-mentioned pH modifier, for example, an acid or a salt base which does not adversely affect the surface treatment such as a phosphoric acid, a condensation phosphoric acid, a hydrofluoric acid, a nitric acid, a perchloric acid, a sulfuric acid, a sodium nitrate, an ammonium hydroxide or a sodium hydroxide or ammonia can be named.

(Manufacturing Methods of the Resin Coated Seamless Aluminum Can or the Resin Coated Aluminum Alloy Can Lid)

The resin coated seamless aluminum can or the resin coated aluminum alloy can lid of the present invention can be manufactured by applying coating treatment to the prepared organic-inorganic composite surface treated layer thus forming the chemical-conversion-treated aluminum sheet, by forming an organic resin layer to a surface of the chemical-conversion-treated aluminum alloy sheet, and by forming the resin-coated aluminum alloy sheet into a seamless can or a can lid. Hereinafter, specific steps of the manufacturing method are explained.

(Coating Treatment Applied to Aluminum Alloy Sheet)

Steps of forming an film on aluminum alloy sheet by applying organic-inorganic composite surface treatment liquid to the aluminum alloy sheet is explained.

Prior to the manufacture of an aluminum chemical conversion treatment material by applying the organic-inorganic composite surface treatment liquid to the aluminum alloy sheet, first of all, a rolling-use oil, a rust prevention oil and the like are removed (degreased) by cleaning a surface of the aluminum alloy sheet. A degreasing method is not particularly limited and may adopt solvent degreasing, alkali degreasing or acidic degreasing used in general.

To be more specific, prior to the above-mentioned treatment of aluminum alloy sheet, first of all, it is preferable to perform a step in which the aluminum alloy sheet is cleaned with an acid. Further, prior to the above-mentioned acid-cleaning step, it is preferable to perform a step in which the aluminum alloy sheet is cleaned with alkali. The best mode is a method which sequentially performs the respective steps in order of alkali cleaning, water cleaning, acid cleaning, water cleaning, non-chromic metal surface treatment, water cleaning and drying.

The above-mentioned alkali cleaning treatment is not particularly limited. For example, it is possible to perform conventional treatments which are used for alkali cleaning treatment of metal such as aluminum or aluminum alloy. Usually, in the above-mentioned alkali cleaning treatment, the alkali cleaning is performed using an alkaline cleaner. Further, the acid cleaning is performed using an acid cleaner.

The alkaline cleaner is not particularly limited and an alkaline cleaner used in usual alkaline cleaning can be used. For example, "Fine Cleaner 4377" (Trademark) made by Nihon Parkerizing Co., Ltd. or the like can be named. The above-mentioned acid cleaner is not particularly limited and, for example, an inorganic acid such as a phosphoric acid, a sulfuric acid, a hydrochloric acid, or "Pal Clean 500" made by Nihon Parkerizing Co., Ltd. or the like can be named.

The above-mentioned acid cleaning treatment and the above-mentioned alkali cleaning treatment are usually performed by a spray method. After performing the above-mentioned acid cleaning or alkali cleaning, for removing the acid cleaning agent or the alkali cleaning agent remaining on a surface of a base material, water cleaning treatment is performed.

As the coating treatment applied to the aluminum alloy sheet, the film can be formed by bringing the above-mentioned organic-inorganic composite surface treatment liquid into contact with the surface of the aluminum alloy sheet thus making the organic-inorganic composite surface treatment liquid react with the surface of the aluminum alloy sheet. The method of treating the aluminum alloy sheet is not particularly limited provided that a method which brings the treatment liquid into contact with the aluminum alloy sheet is used. That is, a usual method such as a roll coating method, a spray method, an immersion method or the like can be used. Among these methods, it is preferable to use the spray method.

It is preferable to perform the above-mentioned treatment of aluminum alloy sheet within a temperature range having a lower limit of 30° C. and an upper limit of 80° C. When the treatment temperature is less than 30° C., a reaction speed is lowered and the precipitation of film is deteriorated. Accordingly, the acquisition of a sufficient quantity of film necessitates the extension of the treatment time thus lowering productivity. When the treatment temperature exceeds 80° C., there arises a possibility that energy loss is increased. The above-mentioned lower limit may more preferably be 50° C., and the above-mentioned upper limit may more preferably be 70° C.

In performing the above-mentioned treatment of aluminum alloy sheet by a spray method, it is preferable to set the treatment time within a range having a lower limit of 1 second and an upper limit of 20 seconds. When the treatment time is less than 1 second, a quantity of formed film is insufficient and hence, there arises a possibility of lowering of corrosion resistance and adhesiveness. On the other hand, when the treatment time exceeds 20 seconds, etching at the time of forming the film excessively advances thus giving rise to a possibility of lowering of adhesiveness and corrosion resistance. Further, the above-mentioned lower limit may more preferably be 3 seconds, and the above-mentioned upper limit may more preferably be 8 seconds.

After performing the above-mentioned treatment of aluminum alloy sheet, water cleaning treatment may be performed when necessary.

The water cleaning treatment is performed once or more to prevent the appearance of film and the like from being adversely affected. In this case, it is preferable to perform the final water cleaning using deionized water. This water cleaning treatment may be either spray water cleaning or immersion water cleaning, and the aluminum alloy sheet may also be washed with water by combining spray water cleaning and immersion water cleaning.

It is preferable to dry the film obtained by the above-mentioned treatment of aluminum alloy sheet after water cleaning. As a method for drying the above-mentioned film, drying by heating may preferably used. For example, the drying by heating may be performed by oven drying and/or forced circulation of hot air. The drying by heating is performed for 6 to 60 seconds at a temperature of 40 to 120° C.

Further, depending on the drying temperature, polymer may be further polymerized on the surface of the aluminum alloy sheet. When the higher corrosion resistance is required, it is possible to increase the degree of polymerization on the surface of the aluminum alloy sheet by setting the drying temperature to 180° C. or more.

Here, during heating, the degree of polymerization becomes larger than a value in the surface treatment liquid. Further, since the above-mentioned Z group is eliminated, the substituent number of Z group also becomes smaller than a value (0.3 to 1.0) in the surface treatment liquid. An adhesion quantity of carbon, an adhesion quantity of phosphorous and an adhesion quantity of zirconium attributed to the organic compound can be adjusted based on the concentration of water-soluble polymer in the treatment liquid or the concentration, the treatment temperature, the treatment time and the like of the phosphorous compound.

A film thickness, a film adhesion quantity and coverage of the organic-inorganic composite surface treated layer, and an adhesion quantity of a zirconium compound or a phosphorous compound may be suitably adjusted to fall with in ranges explained in conjunction with the coating metal material of the present invention. The adjustment can be performed by adjusting the concentration of polymer in the above-mentioned aqueous composition, the concentration of an etchant, the concentration, the treatment temperature, the treatment time and the like of the phosphorous compound.

(Formation of Organic Resin Coated Layer)

On the above-mentioned organic-inorganic composite surface treated layer, an organic resin coated layer is formed. Particularly, a thermoplastic resin layer is formed on the organic-inorganic composite surface treated layer in case of the can, and a coated film (coated film being described later) or the thermoplastic resin layer is formed on the organic-inorganic composite surface treated layer in case of the can lid.

As the thermoplastic resin, polyester-based resin can be named. The thermoplastic polyester resin is not specifically limited and, for example, the thermoplastic polyester-based resin which is constituted of a constituent unit such as an ethylene terephthalate unit, an ethylene naphthalate unit, an ethylene iso phthalate unit, a butylene terephthalate unit or 1,4-cyclohexane di-methanol terephthalate unit can be named. A thermoplastic polyester-based copolymer resin having two or more of the above-mentioned constituent units, or a thermoplastic polyester resin which is a mixture of two or more kinds of thermoplastic polyester resins may also be used. Among these polyester-based resins, it is preferable to use a polyethylene terephthalate resin, a polyethylene terephthalate/polyethylene iso phthalate copolymer resin, a polyethylene terephthalate/polybutylene terephthalate copolymer resin, polyethylene terephthalate/polyethylenenaphthalate copolymer resin or the like which is constituted of the ethylene terephthalate unit.

The thermoplastic polyester resin preferably has a melting point of 130° C. to 255° C. When the melting point is less than 130° C., the retort resistance is deteriorated, while when the melting point exceeds 255° C., the lamination of the organic resin coated layer to metal becomes difficult.

The lamination of the above-mentioned thermoplastic polyester resin may be performed by forming the thermoplastic polyester resin into a film and, thereafter, by laminating the film to metal. Alternatively, the lamination of the above-mentioned thermoplastic polyester resin may be carried out by an extrusion lamination method in which the above-mentioned thermoplastic polyester resin in a molten state by heating is extruded into a film shape through a narrow slit having an extruding width of an extruder and directly laminating the extruded thermoplastic polyester resin to a metal sheet. In laminating the film after forming the film, the above-mentioned film is not specifically limited, and the film may be a non-stretched film, a uniaxially stretched film or a bi-axially stretched film, for example.

The above-mentioned thermoplastic resin may be formed on the organic-inorganic composite surface treated layer by way of an adhesion primer layer of an epoxy phenol resin, an epoxy acrylic resin, a polyester phenolic resin, a polyester amino resin, a polyester urethane resin or the like. The adhesion primer exhibits excellent adhesiveness to both of a metal material and a film. As the epoxyphenol resin-based adhesion primer, a coating material containing a phenol resin and an epoxy resin at a weight ratio of 50:50 to 1:99, particularly at a weight ratio of 40:60 to 5:95 is preferable since the coating material exhibits both excellent adhesiveness and excellent corrosion resistance. The adhesion primer layer may preferably have a thickness of 0.01 to 10 μm in general. The adhesion primer layer may be preliminarily formed on the aluminum alloy sheet or on the above-mentioned polyester film.

(Formation of Coated Film in Case of Can Lid)

In case of the can lid, a coated film formed on the organic-inorganic composite surface treated layer is explained hereinafter.

(Organic Resin Layer (Coated Film))

As the coated film, a thermosetting resin coating material such as a phenol-formaldehyde resin, a furan-formaldehyde resin, a xylene-formaldehyde resin, a ketone-formaldehyde resin, a urea formaldehyde resin, a melamine-formaldehyde resin, an alkyd resin, an unsaturated polyester resin, an epoxy resin, a bismaleimide resin, a triaryl cyanurate resin, a thermosetting acrylic resin, a silicone resin, or an oiliness resin, for example, or a thermoplastic resin coating compound such as a vinyl chloride-vinyl acetate copolymer, a partial saponification product of the vinyl chloride-vinyl acetate copolymer, a vinyl chloride-maleic acid copolymer, a vinyl chloride-maleic acid-vinyl acetate copolymer, an acrylic polymer or saturated polyester resin can be named. These resin coating materials may be used in a single form or in combination of two or more kinds of the coating materials. Among these resin coating materials, an epoxy acrylic coating material, an epoxy phenolic coating material, a polyester-based coating material, an epoxy urea-based coating material, a vinyl organosol-based coating material or the like can be preferably used.

A favorable dry-coated-film mass of the coated film made of an epoxy acrylic coating material, an epoxy phenolic coating material, a polyester-based coating material, an epoxy urea-based coating material or a vinyl organosol-based coating material is described hereinafter. The dry-coated-film mass of the epoxy acrylic coating material is preferably 10 to 160 mg/dm$^2$. The dry-coated-film mass of the coated film made of the epoxy phenol coating material and the polyester-based coating material is preferably 30 to 140 mg/dm$^2$. The dry-coated-film mass of the coated film made of the epoxy urea-based coating material is preferably 30 to 70 mg/dm$^2$. The dry-coated-film mass of the coated film made of the vinyl organosol-based coating material is preferably 30 to 160 mg/dm$^2$.

The above-mentioned coated film is applied to a surface of the organic-inorganic composite surface treated layer using a method such as roller coating, blade coating or spray coating. Further, the coated film is baked by a hot-air oven, an infrared heating furnace or the like thus producing an aluminumalloy-can-lid material. One example of the above-mentioned coated film, a dry condition and a coated film weight after drying is shown in Table 1.

TABLE 1

| Coating material | Solid content (non-volatile matter) [%] | Curing conditions Temperature [° C.] | Time [second] | Favorable dry coated film weight [mg/dm²] |
|---|---|---|---|---|
| Epoxy acrylic resin | 25 to 35 | 230 to 290 | 15 to 45 | 10 to 160 |
| Epoxy phenolic resin | 25 to 35 | 230 to 290 | 15 to 45 | 30 to 140 |
| Polyester | 25 to 35 | 230 to 290 | 15 to 45 | 30 to 140 |
| Epoxy urea | 25 to 35 | 230 to 290 | 15 to 45 | 30 to 70 |
| Vinyl organosol | 25 to 35 | 230 to 290 | 15 to 45 | 30 to 160 |

(Formation of Can)

The resin coated seamless aluminum can of the present invention may be formed by a known forming method using the above-mentioned aluminum alloy body material.

First of all, a coated aluminum sheet or coil is formed into a predetermined shape or size by blanking and is subsequently or simultaneously formed into a can body by a press mold. In general, the coated aluminum sheet or coil is applied to a seamless can formed by drawing or drawing-ironing. Further, the resin coated seamless aluminum can be also manufactured using a conventional known means such as drawing/redrawing, bending and stretching by drawing or redrawing (thinning drawing or stretching), bending and stretching/ironing by drawing and redrawing or drawing/ironing.

Preferably, thinning of a side wall portion is performed by bending and stretching and/or ironing. Compared to thinning of a bottom portion, thinning of the sidewall portion is performed by bending and stretching and/or ironing such that a thickness of the side wall portion is preferably set to a value which falls within a range from 20 to 95% of an original sheet thickness of a lamination sheet, and more particularly to a value which falls within a range from 30 to 90% of the original sheet thickness of a lamination sheet.

The produced can is subject to heat treatment at least in one stage so as to perform orientation crystallization of a polyester-based resin layer of a can body portion, a residual strain generated by the above-mentioned forming is removed, and a lubricant used at the time of forming is evaporated from a surface of the can, and printed ink printed on the surface is dried and cured. A container after heat treatment is quenched or cooled and, thereafter, when necessary, neck-in forming is applied to the can in one stage or in a multiple stages, and flange forming is applied to the can thus forming a seamed can. After forming a seamless can, an upper portion of the seamless can is deformed into a bottle shape.

(Formation of Can Lid)

Further, the aluminum alloy can lid of the present invention is formed by a known forming method such as a press forming method using the above-mentioned aluminum alloy can lid material.

First of all, the coated aluminum sheet or coil is formed into a predetermined shape and size by blanking and, subsequently or simultaneously, the coated aluminum sheet or coil is formed into a lid by a press mold. In general, the coated aluminum sheet or coil is applicable to a stay-on-tab-type easy-to-open lid or a full-open-type easy-to-open lid.

[Embodiment]

Hereinafter, the present invention is explained more specifically in conjunction with embodiments. However, the present invention is not limited to these embodiments. Further, in the embodiments, "parts" implies "parts by mass" unless otherwise specified.

Preparation of Non-Chromium Metal Surface Treatment Agent (Embodiment 1)

Preparation of Polymer

A water-soluble polymer is a polymer expressed by the formula (I) in which X is independently a hydrogen atom or a Z group (=—$CH_2N(CH_3)_2$) in respective constitutional units expressed by the formula (I) and an introducing ratio of the Z group per one benzene ring is 0.5, and an average molecular weight of the organic compound is 3000 when all X are hydrogen atoms.

Calculation of Introducing Ratio of Z Group

A quantitative analysis of elements C,H,N,S contained in the prepared polymer are determined using an EA1108-type elemental analyzer made by FISONS Inc. Based on a result of the quantitative analysis, Z group introducing ratio is calculated.

Preparation of Treatment Liquid

Ion-exchanged water at room temperature is filled in a vessel equipped with an agitator. While agitating the ion-exchanged water at a room temperature, 71 g/L of 40% zirconium fluoride hydrogen acid (containing 17.6% as Zr), 15 g/L of 85% phosphate and 9 g/L of 55% hydrofluoric acid are added to the ion-exchanged water, and the above-mentioned 40 g/L of polymer is dissolved in the ion-exchanged water with agitation. Then, the ion-exchanged water is diluted to 4% and, thereafter, ammonium is added to the ion-exchanged water to set pH to 3.0 thus acquiring a pale yellow aqueous solution.

(Embodiment 2)

A water-soluble polymer is a polymer expressed by the formula (I) in which X is independently a hydrogen atom or a Z group (=—$CH_2N(CH_3)_2$) in respective constitutional units expressed by the formula (I) and an introducing ratio of the Z group per one benzene ring is 0.5, and an average molecular weight of the organic compound is 1500 when all X are hydrogen atoms. Besides the above-mentioned constitutions, the water-soluble polymer of this embodiment is substantially equal to the water-soluble polymer of the embodiment 1.

(Embodiments 3 to 16, Comparisons 1 to 8)

In the above-mentioned embodiment 1, a content of zirconium, a content of phosphorous, polymer concentration, pH, average molecular weight of polymer, and the Z-group introducing ratio of polymer are changed as shown in Table and other conditions are set substantially equal to the embodiment 1.

(Cleaning of Aluminum Alloy Sheet)

A commercially-available aluminum-manganese alloy sheet (kind: JIS A3004, sheet thickness: 0.3 mm, sheet size: 200×300 mm in case of can, kind: JIS A5182, sheet thickness: 0.25 mm, sheet size: 200×300 mm in case of can lid) is subject to spray treatment under conditions in which agent concentration is 20 g/L, treatment temperature is 60° C. and treatment time is 7 seconds using a commercially-available strong alkaline degreasing agent "FINE CLEANER 4377" (trademark, made by Nihon Parkerizing Co., Ltd.). Thereafter, an alkali content remaining on a surface of the aluminum-manganese alloy sheet is cleaned with service-water.

(Treatment of Aluminum Alloy Sheet)

The produced aluminum alloy sheet is subjected to spray treatment using the surface treatment agent of the embodiment and the comparison example at a temperature of 50° C. to 60° C. and treatment time of 1 to 5 seconds. Thereafter, unreacted products are cleaned with service-water, and the aluminum alloy sheet is further cleaned with deionized water of 3,000,000Ω or more. Thereafter, the aluminum alloy sheet is dried at a temperature of 80° C. thus producing a surface-treated metal sheet which forms the organic-inorganic composite surface treated layer.

COMPARISON EXAMPLES 9, 10

As the surface treatment agent, "ALODINE N-405" (comparison example 9: zirconium phosphate treatment agent) made by Nihon Parkerizing Co., Ltd. and "ALCHROM K702" (comparison example 10: phosphoric chromate treatment agent) made by Nihon Parkerizing Co., Ltd. are used.

The surface-treated metal sheet which forms a chemical conversion film thereon is produced under the conditions as same as the conditions of the above-mentioned cleaning step or spray treatment.

(Film Mass Measurement)

The adhesion quantities (mg/m$^2$) of zirconium, phosphorus and chromium in the above-mentioned background film are measured using the X-ray fluorescence analyzer "XRF-1700" made by SHIMADZU CORPORATION. The adhesion quantity (mg/m$^2$) of carbon is measured using the Multiphase Carbon and Hydrogen/Moisture "RC412" made by LECO Corporation. The sample size is 32 cm$^2$ and the measurement is performed at a temperature of 400° C. for minutes. A result of the measurement is shown in Table 2.

TABLE 2

| | | composition of non-chromium metal surface treatment | | | | | | | | |
|---|---|---|---|---|---|---|---|---|---|---|
| | | organic polymer | | | inorganic content | | | mass of coated film (mg/m$^2$) | | |
| | | Average molecular weight [X as hydrogen] | Z group introduction ratio (piece/benzene ring) | concentration (mg/L) | Zr concentration (mg/L) | P concentration (mg/L) | pH | C | Zr | P |
| Embodiment | 1 | 3000 | 0.5 | 1500 | 500 | 500 | 3.0 | 35 | 10 | 5 |
| | 2 | 1500 | 0.5 | 1500 | 500 | 500 | 3.0 | 20 | 10 | 5 |
| | 3 | 1000 | 0.3 | 1500 | 500 | 500 | 3.0 | 16 | 10 | 5 |
| | 4 | 7000 | 0.5 | 1500 | 500 | 500 | 3.0 | 40 | 10 | 5 |
| | 5 | 10000 | 0.7 | 1500 | 500 | 500 | 3.0 | 42 | 10 | 5 |
| | 6 | 100000 | 1 | 1500 | 500 | 500 | 3.0 | 58 | 10 | 5 |
| | 7 | 3000 | 0.5 | 100 | 100 | 100 | 3.0 | 5 | 2 | 1 |
| | 8 | 3000 | 0.5 | 300 | 300 | 300 | 3.0 | 16 | 6 | 3 |
| | 9 | 3000 | 0.5 | 1000 | 700 | 700 | 3.0 | 34 | 8 | 4 |
| | 10 | 3000 | 0.5 | 3000 | 1000 | 1000 | 3.0 | 48 | 16 | 8 |
| | 11 | 3000 | 0.5 | 10000 | 10000 | 10000 | 3.0 | 60 | 20 | 10 |
| | 12 | 3000 | 0.5 | 1500 | 500 | 500 | 2.5 | 40 | 20 | 10 |
| | 13 | 3000 | 0.5 | 1500 | 500 | 500 | 2.8 | 35 | 16 | 8 |
| | 14 | 3000 | 0.5 | 1500 | 500 | 500 | 3.4 | 35 | 10 | 5 |
| | 15 | 3000 | 0.5 | 1500 | 500 | 500 | 4.0 | 25 | 12 | 6 |
| | 16 | 3000 | 0.5 | 1500 | 500 | 500 | 5.3 | 10 | 2 | 1 |
| Comparison example | 1 | 300 | 0.1 | 1500 | 500 | 500 | 3.0 | 3 | 8 | 4 |
| | 2 | 200000 | 1.8 | 1500 | 500 | 500 | 3.0 | 62 | 10 | 5 |
| | 3 | 3000 | 0.5 | 50 | 50 | 50 | 3.0 | 2 | 1 | 0.5 |
| | 4 | 3000 | 0.5 | 20000 | 20000 | 20000 | 3.0 | 64 | 24 | 12 |
| | 5 | 3000 | 0.5 | 1500 | 500 | 500 | 1.5 | 45 | 28 | 14 |
| | 6 | 3000 | 0.5 | 1500 | 500 | 500 | 5.8 | 5 | 0.6 | 0.3 |
| | 7 | 3000 | 0.5 | 50 | 700 | 700 | 3.0 | 2 | 10 | 5 |
| | 8 | 3000 | 0.5 | 30000 | 700 | 700 | 3.0 | 66 | 10 | 5 |
| | 9 | | | ALODINE N-405 | | | | 0 | 8 | 4 |
| | 10 | | | ALCHROM K702 | | | | 0 | Cr20 | 10 |

(Formation of Thermoplastic Resin Layer)

To the produced surface-treated metal sheet which forms the organic-inorganic composite surface treated layer thereon, a polyethylene terephthalate resin film, a polyethylene terephthalate/polyethylene iso phthalate copolymer resin film, a polyethylene terephthalate/polybutylene terephthalate copolymer resin film or a polyethylene terephthalate/polyethylenenaphthalate copolymer resin film is thermally laminated at a lamination roll temperature of 150° C. and at a sheet feeding speed of 150 m/min and, thereafter, the resin-coated surface-treated metal sheet is immediately cooled with water. Here, prior to the heat lamination, an epoxy phenol-based primer having a thickness of 1 μm is applied to a lamination surface side thereof. In such a manner, a resin-coated seamless aluminum can material coated with the thermoplastic organic resin layer and an aluminum alloy can lid material coated with the thermoplastic organic resin are produced.

(Formation of Coated Film in Case of Can Lid)

In the case of the can lid, to the produced surface-treated metal sheet which forms the organic-inorganic composite surface treated layer thereon, an epoxy acrylic coating material, an epoxy phenolic coating material, a polyester-based coating material, an epoxy urea-based coating material or a vinyl organosol-based coating material is applied using a roller coater. Thereafter, the surface-treated metal sheet is baked in a hot-air oven under conditions shown in Table 1 thus acquiring the aluminum alloy can lid material to which the coated film is applied.

(Can Body Production)

The produced resin-coated seamless aluminum can material is formed into a disc shape having a diameter of 166 mm by blanking in the direction in a state that the above-mentioned resin-coated surface is provided to at least a can-body surface to be evaluated and shown below, and is formed into a shallow-drawn cup by drawing. Then, the shallow-drawn cup is formed into the can body by redrawing and ironing, and deep-drawing and ironing. Various characteristics of this can body are as follows.

Can-body diameter: 66 mm
Can-body height: 128 mm
Average sheet thickness reduction rate of side wall portion of can to original sheet thickness: 63%

The can body is formed by doming using an ordinary method, is subject to heat treatment at a temperature of 220° C. and, thereafter, is gradually cooled. After cooling, trimming of an opening end peripheral portion, printing on an outer surface of a can barrel and baking and drying of printing, neck-forming and flange-forming are performed thus producing a seamless can body for two-piece can having a capacity of 350 ml. No problem arises in producing the seamless can body. Then, the can body is evaluated as follows.

(Production of Can Lid)

In the can lid, the produced resin-coated aluminum alloy can lid material is formed into a disc having a diameter of 68.7 mm by blanking in the direction in a state that the above-mentioned resin-coated surface is provided at least to an inner-surface side of the lid. Then, by forming a partially-opening-type score (opening width: 22 mm, remaining score thickness: 110 µm, score width: 20 µm) on an outer surface side of the lid and by riveting and attaching a tab for opening on the outer surface of the lid, an SOT lid is produced.

(Evaluation Method for Can Body)

The following evaluations are performed, and a result of the evaluation on can body is shown in Table 3.

1. Film Appearance

A surface of the resin coated seamless aluminum can body obtained by the above-mentioned manner is evaluated with naked eyes.

In Table 3, the can bodies which exhibit a good appearance without abnormalities such as repellency, unevenness and remarkable discoloration are indicated by "Good". Can bodies which exhibits abnormalities are indicated by symbols and notes which express their abnormal states.

2. Evaluation of Resistance Delamination with Flaws

The manufactured thermoplastic resin coated aluminum alloy can body is filled with distilled water, and a lid is seamed to the can body thus forming a can. Thereafter, a retort treatment is applied to the can at a temperature of 130° C. for 30 minutes. After returning the temperature of the can to room temperature, the presence or the non-presence of peeling-off of an outer surface film in the vicinity of a seamed portion is evaluated with naked eyes.

When the film peeling-off is not generated, "Good" is given, while when the film peeling-off is generated, "Bad" is given. The evaluation result is collectively shown in Table 3.

3. Impact Resistance Adhesion Test

The manufactured thermoplastic resin coated aluminum alloy can body is filled with carbonated water, and a lid is seamed to the can body. The seamed can is stored for two weeks at a temperature of 37° C. and, thereafter, is stored for two days at a temperature of 5° C. Then, the can body is left at rest in a horizontal posture with a temperature kept at 5° C. Then, the can body is deformed by an impact. That is, to deform the can body the impact, a weight of 1 Kg having a radius of 65.5 mm and a spherical surface is dropped from the height of 40 mm onto an upper surface portion of the can body such that the spherical surface of the weight hit the can. Thereafter, the can is opened. Then, electric conduction of a portion of the can deformed by the impact is measured, and the impact resistance of the can is evaluated. The electric conduction measurement is performed as follows. A sponge containing 1% of NaCl solution is brought into contact with a portion deformed by the impact, a voltage of 6.0V is applied between an electrode (cathode electrode) in the inside of the sponge and the can body, and a current which flows between the electrode and the can body is measured. When an average current value is smaller than 0.1 mA, "Good" is given, while when the average current value is larger than 0.1 mA, "Bad" is given. The evaluation result is collectively shown in Table 3.

4. Pack Test I (Corrosion Resistance)

The manufactured thermoplastic resin coated aluminum alloy can body is filled with 350 g of Coca-Cola as a content, and a lid is seamed to the can body in accordance with an ordinary method. The can body is stored for three months at a temperature of 37° C. in an upright posture and, thereafter, a seamed portion is cut off using a can opener, and the lid is separated from the can body. Then, a corroded state of an inner surface of the can body is observed using a microscope, and the corrosion resistance of the can body is evaluated.

The pack test I is carried out with the number of samples being set to n=50. The evaluation result is collectively shown in Table 3.

5. Pack Test II (Corrosion Resistance)

The manufactured thermoplastic resin coated aluminum alloy can body is filled with 350 g of hiLiki lemon as a content, and a lid is seamed to the can body in accordance with an ordinary method. The can body is stored for three months at a temperature of 37° C. in an upright posture and, thereafter, is stored for two days at a temperature of 5° C. Then, the can body is left at rest in a horizontal posture with a temperature kept at 5° C. Then, the can body is deformed by an impact. That is, to deform the can body by the impact, a weight of 1 Kg having a radius of 65.5 mm and a spherical surface is dropped from the height of 40 mm onto an upper surface portion of the can body such that the spherical surface of the weight hit the can. Further, the can body is stored for three months at a temperature of 37° C. in an upright posture. Thereafter, a seamed portion is cut off using a can opener, and the lid is separated from the can body. Then, a corroded state of an inner surface of the can body is observed using a microscope, and the corrosion resistance of the can body is evaluated. The pack test II is carried out with the number of samples being set to n=50. The evaluation result is collectively shown in Table 3.

TABLE 3 evaluation of thermoplastic resin-coated can body

|  |  | film appearance | flaw resistance delamination evaluation | impact resistance adhesiveness test | pack Test I | pack Test II | kinds of resin |
|---|---|---|---|---|---|---|---|
| Embodiment | 1 | Good | Good | Good | NA | NA | copolyester resin (polyethylene terephthalate/polyethylene isophthalate (weight ratio 89/11)) |
|  | 2 | Good | Good | Good | NA | NA |  |
|  | 3 | Good | Good | Good | NA | NA |  |
|  | 4 | Good | Good | Good | NA | NA |  |
|  | 5 | Good | Good | Good | NA | NA | polyethylene terephthalate resin//epoxy phenolic resin primer |
|  | 6 | Good | Good | Good | NA | NA |  |
|  | 7 | Good | Good | Good | NA | NA |  |
|  | 8 | Good | Good | Good | NA | NA |  |
|  | 9 | Good | Good | Good | NA | NA | copolyester resin (polyethylene terephthalate/polybutylene terephthalate (weight ratio 89/11)) |
|  | 10 | Good | Good | Good | NA | NA |  |
|  | 11 | Good | Good | Good | NA | NA |  |
|  | 12 | Good | Good | Good | NA | NA |  |
|  | 13 | Good | Good | Good | NA | NA | copolyester resin (polyethylene terephthalate/polyethylene naphthalate (weight ratio 89/11)) |
|  | 14 | Good | Good | Good | NA | NA |  |
|  | 15 | Good | Good | Good | NA | NA |  |
|  | 16 | Good | Good | Good | NA | NA |  |
| Comparison example | 1 | Good | Bad | Bad | NA | corrosion on impact deformation portion | A |
|  | 2 | Good | Bad | Bad | corrosion on neck-in portion, seamed portion | corrosion on impact deformation portion | B |
|  | 3 | Good | Bad | Bad | corrosion on neck-in seamed portion | corrosion on impact deformation portion |  |
|  | 4 | spot pattern | Bad | Bad | NA | corrosion on impact deformation portion | C |
|  | 5 | Whitened | Bad | Bad | NA | corrosion on impact deformation portion |  |
|  | 6 | Good | Bad | Bad | corrosion on neck-in portion, seamed portion | corrosion on impact deformation portion | D |
|  | 7 | Good | Bad | Bad | NA | corrosion on impact deformation portion |  |
|  | 8 | spot pattern | Bad | Bad | NA | corrosion on impact deformation portion |  |
|  | 9 | Good | Bad | Bad | corrosion on neck-in portion, seamed portion | corrosion on impact deformation portion | A |
|  | 10 | Good | Good | Good | NA | NA |  |

Resin A: copolyester resin (polyethylene terephthalate/polyethylene isophthalate (weight ratio 89/11))
Resin B: polyethylene terephthalate resin//epoxy phenolic resin primer
Resin C: copolyester resin (polyethylene terephthalate/polybutylene terephthalate (weight ratio 89/11))
Resin D: copolyester resin (polyethylene terephthalate/polyethylene naphthalate (weight ratio 89/11))
NA: No abnormality (Evaluation method of can lid)

With respect to the can lid, the following evaluation is performed, and the result of the evaluation is shown in Table 4.

1. Film Appearance

A surface of the resin coated aluminum alloy can lid obtained by the above-mentioned manner is evaluated with naked eyes.

In Table 4, the can lids which exhibit a good appearance without abnormalities such as repellency, unevenness and remarkable discoloration are indicated by "Good". Can lids which exhibit abnormalities are indicated by symbols and notes which express their abnormal states.

2. Feathering Evaluation (Adhesiveness)

With respect to a thermoplastic resin coated aluminum alloy can lid obtained by the above-mentioned manner, a retort sterilization treatment (130° C. for 50 minutes) is performed. Thereafter, an opening is actually formed in the can lid, and generation of feathering at an opening portion is evaluated.

Further, with respect to a coated film coated aluminum alloy can lid obtained by the above-mentioned manner, a boiling treatment (for 30 minutes) is performed. Thereafter, an opening is actually formed in the can lid, and the generation of feathering at an opening portion is evaluated.

The feathering test is carried out with the number of samples being set to n=50. When a length of an average feathering is less than 0.5 mm, "Good" is given. When a length of the average feathering is not less than 0.5 mm and less than 1.0 mm, "Fair" is given. When a length of the average feathering is not less than 11.0 mm, "Bad" is given. The evaluation result is collectively shown in Table 4. A usable range of the can lid as a product is the can lid indicated by "Good" and "Fair".

3. Opening Properties Evaluation

With respect to a thermoplastic resin coated aluminum alloy can lid obtained by the above-mentioned manner, a retort sterilization treatment (130° C. for 50 minutes) is performed. Thereafter, an opening property is evaluated.

Further, with respect to a coated film coated aluminum alloy can lid obtained by the above-mentioned manner, a boiling treatment (for 30 minutes) is performed. Thereafter, an opening property is evaluated.

The evaluation result is described with a formula, that is, number of defective opening due to occurrence of cracks/number of opening. The evaluation result is collectively shown in Table 4.

4. Pack Test

A welded can body for a general food can is filled with corn soup as a content, and thermoplastic resin coated aluminum alloy can lid obtained by the above-mentioned manner is seamed to the can body in accordance with an ordinary method. The sterilization treatment is applied to the seamed can at a temperature of 130° C. for 90 minutes. The seamed can is stored for two months in an up-side-down posture at a temperature of 55° C. and, thereafter, a seamed portion is cut off using a can opener, and the lid is separated from the can body. Then, a corroded state of an inner surface of the lid is observed using a microscope, and the corrosion resistance of the lid is evaluated.

A steel-made drawn and ironed can body is filled with Coca-Cola (trademark) as a content, and the coated aluminum alloy can lid obtained by the above-mentioned manner is seamed to the can body in accordance with an ordinary method. The seamed can is stored for three months in an inversed posture at a temperature of 37° C. and, thereafter, a seamed portion is cut off using a can opener, and the lid is separated from the can body. Then, a corroded state of an inner surface of the lid is observed using a microscope, and the corrosion resistance of the lid is evaluated.

The pack test is carried out with the number of samples being set to n=50. The evaluation result is collectively shown in Table 4.

TABLE 4

| | | | thermoplastic resin | | | | coated film | | |
|---|---|---|---|---|---|---|---|---|---|
| | | film appearance | feathering evaluation | opening properties evaluation | pack Test | kinds of resin | feathering evaluation | opening properties evaluation | pack Test | kinds of coated film |
| Embodiment | 1 | Good | Good | 0/200 | NA | copolyester resin (polyethylene terephthalate/ polyethylene isophthalate (weight ratio 89/11)) | Good | 0/200 | NA | epoxy acrylic coated film |
| | 2 | Good | Good | 0/200 | NA | | Good | 0/200 | NA | |
| | 3 | Good | Good | 0/200 | NA | | Good | 0/200 | NA | |
| | 4 | Good | Good | 0/200 | NA | | Good | 0/200 | NA | |
| | 5 | Good | Good | 0/200 | NA | polyethylene terephthalate resin/epoxy phenolic resin primer | Good | 0/200 | NA | epoxy phenolic coated film |
| | 6 | Good | Good | 0/200 | NA | | Good | 0/200 | NA | |
| | 7 | Good | Fair | 0/200 | NA | | Good | 0/200 | NA | |
| | 8 | Good | Good | 0/200 | NA | | Good | 0/200 | NA | |
| | 9 | Good | Good | 0/200 | NA | copolyester resin (polyethylene terephthalate/ polybutylene terephthalate (weight ratio 89/11)) | Good | 0/200 | NA | epoxy urea coated film |
| | 10 | Good | Good | 0/200 | NA | | Good | 0/200 | NA | |
| | 11 | Good | Fair | 0/200 | NA | | Good | 0/200 | NA | |
| | 12 | Good | Good | 0/200 | NA | | Good | 0/200 | NA | |
| | 13 | Good | Good | 0/200 | NA | copolyester resin | Good | 0/200 | NA | vinyl organosol coated film |
| | 14 | Good | Good | 0/200 | NA | | Good | 0/200 | NA | |

TABLE 4-continued

| | | | thermoplastic resin | | | coated film | | | |
|---|---|---|---|---|---|---|---|---|---|
| | | film appearance | feathering evaluation | opening properties evaluation | pack Test | kinds of resin | feathering evaluation | opening properties evaluation | pack Test | kinds of coated film |
| | 15 | Good | Good | 0/200 | NA | (polyethylene terephthalate/ polyethylene naphthalate (weight ratio 89/11)) | Good | 0/200 | NA | |
| | 16 | Good | Fair | 0/200 | NA | | Good | 0/200 | NA | |
| Comparison example | 1 | Good | Fair | 4/200 | NA | A | Fair | 0/200 | NA | E |
| | 2 | Good | Good | 0/200 | NA | B | Fair | 0/200 | corrosion on rivet, score portions | F |
| | 3 | Good | Fair | 13/200 | NA | | Fair | 0/200 | corrosion on rivet, score portions | |
| | 4 | spot Pattern | Bad | 48/200 | NA | C | Bad | 0/200 | NA | G |
| | 5 | whitened | Bad | 44/200 | NA | | Bad | 1/200 | corrosion on score portions | |
| | 6 | Good | Fair | 11/200 | NA | D | Fair | 0/200 | corrosion on rivet, score portions | H |
| | 7 | Good | Fair | 6/200 | NA | | Fair | 0/200 | corrosion on score portions | |
| | 8 | spot Pattern | Good | 0/200 | NA | A | Fair | 0/200 | NA | E |
| | 9 | Good | Bad | 97/200 | NA | | Bad | 3/200 | corrosion on rivet, score portions | |
| | 10 | Good | Fair | 0/200 | NA | | Good | 0/200 | NA | |

Resin A: copolyester resin (polyethylene terephthalate/polyethylene isophthalate (weight ratio 89/11))
Resin B: polyethylene terephthalate resin//epoxy phenolic resin primer
Resin C: copolyester resin (polyethylene terephthalate/polybutylene terephthalate (weight ratio 89/11))
Resin D: copolyester resin (polyethylene terephthalate/polyethylene naphthalate (weight ratio 89/11))
Coated film E: Epoxy acrylic coated film
Coated Film F: Epoxy phenolic coated film
Coated Film G: Epoxy urea coated film
Coated Film H: Vinyl organosol coated film
NA: No abnormality

As described above, the resin coated seamless aluminum can and the can lid obtained by the embodiments exhibit all of excellent adhesiveness, excellent opening property and excellent corrosion resistance.

Industrial Applicability

The present invention overcomes these drawbacks which these prior arts possess, and is used as a can body or a can lid of a food can or the like which exhibits favorable corrosion resistance even when the can body or the can lid is formed by molding by applying strict forming without using chromium on a surface treated layer, and exhibits excellent adhesiveness with coating material or a thermoplastic lamination film at the time of forming the can. Accordingly, the present invention has an extremely large industrial applicability.

The invention claimed is:

1. A resin coated seamless aluminum can having excellent corrosion resistance and adhesiveness, comprising:
an organic-inorganic composite surface treated layer made of adhesion quantities of a zirconium compound, a phosphorus compound and an organic compound formed on at least an inner surface of an aluminum alloy sheet, wherein an adhesion quantity of the zirconium compound is 2 to 20 mg/m² expressed in terms of zirconium atoms, an adhesion quantity of the phosphorus compound is 1 to 10 mg/m² expressed in terms of phosphorus atoms, and an adhesion quantity of the organic compound is 5 to 60 mg/m² expressed in terms of carbon atoms,
the organic compound is formed of an organic polymer having structure units expressed by the following formula (I)

(I)

and an average molecular weight of the organic polymer is 1,000 to 100,000 when all X are hydrogen atoms, and
a thermoplastic resin layer further formed on the organic-inorganic composite surface treated layer,
wherein, in the formula (I), X in respective structural units are independently constituted of a hydrogen atom or a Z group expressed by the following formula (II)

(II)

and an introducing ratio of the Z group per one benzene ring is 0.3 to 1.0, and
wherein, in the formula (II), $R^1$ and $R^2$ in respective structural units are independently constituted of a hydrogen atom, a $C_1$ to $C_{10}$ alkyl group or a $C_1$ to $C_{10}$ hydroxyalkyl group,
wherein the resin coated seamless aluminum can is produced by deep drawing, drawing and ironing or stretch drawing of the organic polymer coated aluminum alloy sheet.

2. A resin coated seamless aluminum can according to claim 1, wherein the aluminum alloy sheet is an aluminum alloy sheet containing 0.2 to 5.5% by weight of Mg, 0.05 to 1% by weight of Si, 0.05 to 1% by weight of Fe, 0.01 to 0.35% by weight of Cu, 0.01 to 2% by weight of Mn, and 0.01 to 0.4% by weight of Cr.

3. A resin coated seamless aluminum can according to claim 1, wherein the thermoplastic resin is a polyester-based resin.

4. A resin coated seamless aluminum can according to claim 1, wherein the aluminum can is formed by molding by applying deep drawing or drawing and ironing to a resin coated aluminum alloy sheet, heat-setting the cup, applying neck-in forming to the heat-set cup to a predetermined diameter, and applying flange forming to the neck-in formed body.

5. A resin coated aluminum alloy can lid formed of an aluminum alloy sheet and having excellent corrosion resistance and adhesiveness, wherein
an organic-inorganic composite surface treated layer made of a zirconium compound, a phosphorus compound and an organic compound is formed on at least an inner surface of the aluminum alloy sheet, wherein an adhesion quantity of the zirconium compound is 2 to 20 mg/m² expressed in terms of zirconium atoms, an adhesion quantity of the phosphorus compound is 1 to 10 mg/m² expressed in terms of phosphorus atoms and an adhesion quantity of the organic compound is 5 to 60 mg/m² expressed in terms of carbon atoms,
the organic compound is formed of an organic polymer having structure units expressed by the following formula (I)

(I)

and an average molecular weight of the organic polymer is 1,000 to 100,000 when all X are hydrogen atoms; and
an organic resin coated layer is further formed on the organic-inorganic composite surface treated layer,
wherein, in the formula (I), X in respective structural units are independently constituted of a hydrogen atom or a Z group expressed by the following formula (II)

(II)

and an introducing ratio of the Z group per one benzene ring is 0.3 to 1.0,
wherein, in the formula (II), $R^1$ and $R^2$ in respective structural units are independently constituted of a hydrogen atom, a $C_1$ to $C_{10}$ alkyl group or a $C_1$ to $C_{10}$ hydroxyalkyl group,
wherein resin coated aluminum alloy can lid is produced by rivet forming and score forming of the resin coated aluminum sheet.

6. A resin coated aluminum alloy can lid according to claim 5, wherein the aluminum alloy sheet is an aluminum alloy sheet containing 0.2 to 5.5% by weight of Mg, 0.05 to 1% by weight of Si, 0.05 to 1% by weight of Fe, 0.01 to 0.35% by weight of Cu, 0.01 to 2% by weight of Mn, and 0.01 to 0.4% by weight of Cr.

7. A resin coated aluminum alloy can lid according to claim 5, wherein the organic resin coated layer formed on the surface treated layer is a coated film.

8. A resin coated aluminum alloy can lid according to claim 5, wherein the organic resin coated layer formed on the surface treated layer is a thermoplastic resin.

9. A resin coated seamless aluminum can, formed from a sheet comprising:
an aluminum alloy substrate for shaping to the form of a can, a first layer coated on a surface of the aluminum alloy substrate to be the inside of the can, and a second layer coated on a surface of the first layer coating to be inside of the can,
the first layer coating comprising an organic-inorganic composite surface treated layer of a zirconium compound, a phosphorous compound and an organic compound,
the zirconium compound being present in an adhesion quantity of 2 to 20 mg/m² expressed in terms of zirconium atoms,
the phosphorous compound being present in an adhesion quantity of 1 to 10 mg/m² expressed in terms of phosphorous atoms, and
the organic compound being present in an adhesion quantity of 5 to 60 mg/m² expressed in terms of carbon atoms,
the organic compound being formed of an organic polymer having structural units of formula (I)

(I)

wherein X is hydrogen or a Z group, and wherein said organic polymer has a molecular weight of 1,000 to 100,000 when X is hydrogen,
wherein, in the formula (I), when X is a Z group, the Z group has the following formula (II)

(II)

and an introducing ratio of the Z group per one benzene ring is 0.3 to 1.0,
  wherein $R^1$ and $R^2$ are independently hydrogen, a $C_1$ to $C_{10}$ alkyl group, or a $C_1$ to $C_{10}$ hydroxy alkyl group, and
  wherein said second layer formed on the inside surface of the organic-inorganic composite surface treated layer comprises a thermoplastic resin layer.

10. A resin coated aluminum alloy can lid, formed from a sheet comprising:
  an aluminum alloy substrate for shaping to the form of a can lid, a first layer coated on a surface of the aluminum alloy substrate to be an inside surface of the can lid, and a second layer coated on a surface of the first layer coating to be on the inside of the can lid,
  the first layer coating comprising an organic-inorganic composite surface treated layer of a zirconium compound, a phosphorous compound and an organic compound,
  the zirconium compound being present in an adhesion quantity of 2 to 20 mg/m² expressed in terms of zirconium atoms,
  the phosphorous compound being present in an adhesion quantity of 1 to 10 mg/m² expressed in terms of phosphorous atoms, and
  the organic compound being present in an adhesion quantity of 5 to 60 mg/m² expressed in terms of carbon atoms,
  the organic compound being formed of an organic polymer having structural units of formula (I)

(I)

wherein X is hydrogen or a Z group, and wherein said organic polymer has a molecular weight of 1,000 to 100,000 when X is hydrogen,
wherein, in the formula (I), when X is a Z group, the Z group has the following formula (II)

(II)

and an introducing ratio of the Z group per one benzene ring is 0.3 to 1.0,
  wherein $R^1$ and $R^2$ are independently hydrogen, a $C_1$ to $C_{10}$ alkyl group, or a $C_1$ to $C_{10}$ hydroxy alkyl group, and
  wherein said second layer coated on the first layer coating to be on an inside of the can lid comprises an organic resin coated layer.

* * * * *